Dec. 23, 1969  A. P. NEWMAN  3,486,165
CABLE INSULATION RETAINER
Filed March 6, 1968
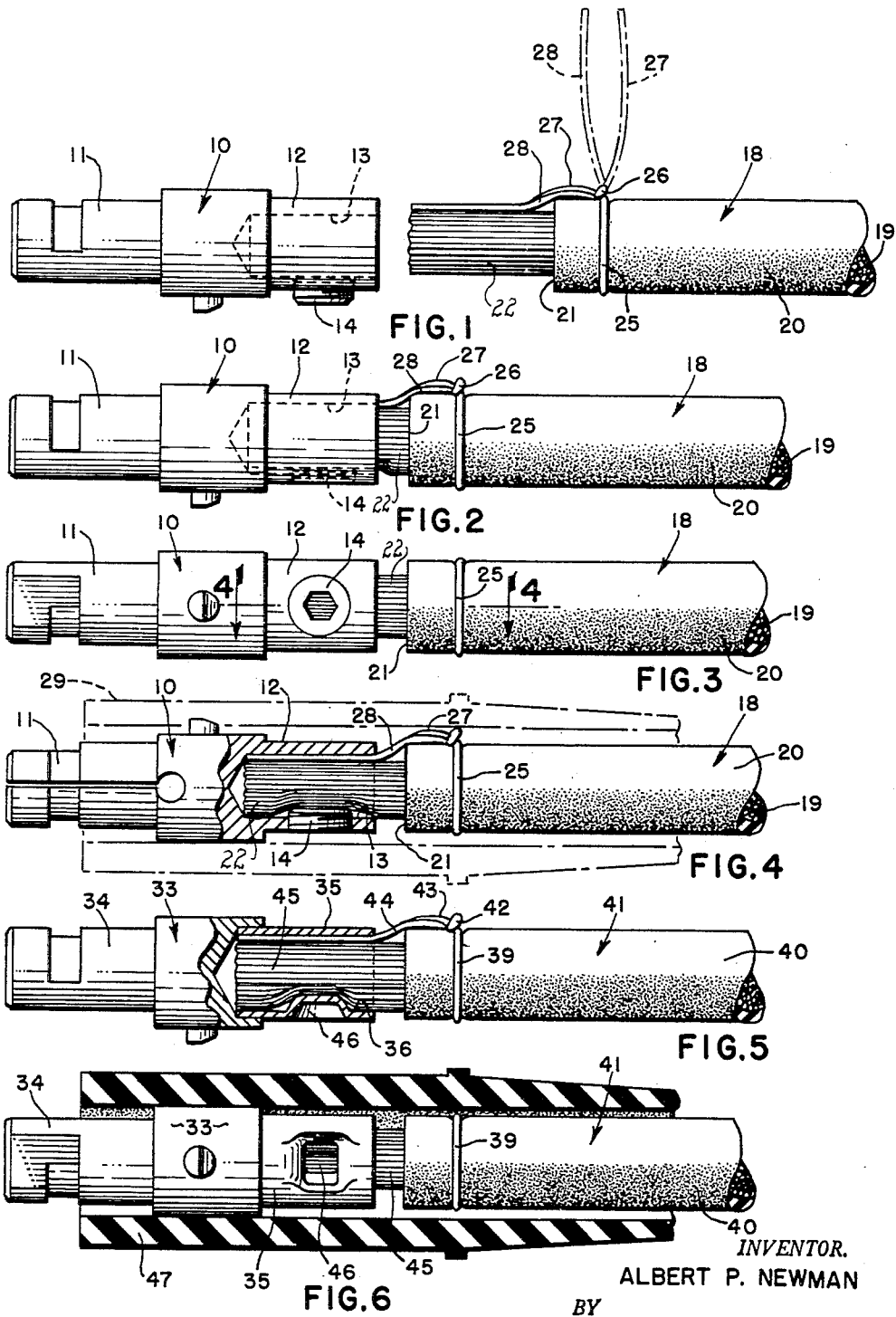
INVENTOR.
ALBERT P. NEWMAN
BY
Burton Perlman
ATTORNEY

United States Patent Office 3,486,165
Patented Dec. 23, 1969

---

3,486,165
CABLE INSULATION RETAINER
Albert P. Newman, Springfield Township, Hamilton County, Ohio, assignor to Empire Products, Inc., Cincinnati, Ohio, a corporation of Ohio
Filed Mar. 6, 1968, Ser. No. 710,897
Int. Cl. H01r 13/58
U.S. Cl. 339—223                                     4 Claims

ABSTRACT OF THE DISCLOSURE

To prevent cable insulation from slipping on an electrical cable after a cable end has been stripped and joined to an electrical cable terminal member, the invention provides filament means which grips the cable insulation and also is in engagement with the cable terminal member.

SPECIFICATION

This invention relates to electrical connectors such as may be attached at the ends of electrical cables, and more specifically to such an electrical cable and connector assembly in which connection between connector and cable is effected by retention of the conductive strands of the cable by the connector.

In many industrial applications where an electric outlet must be available at a position remote from the power source, it is common practice to employ a plurality of electrical cable segments to make up cable means reaching from power soure to the take-off point where the power is utilized. The first cable segment is attached to the power source and the others are linked to the first by releasable cable terminal members. From a practical point of view, this practice has the advantage of not burdening workmen with the necessity of dealing with a cable unit unwieldly as to size and weight, for this would be necessary if a single cable covering the distance were used. It is common, where cable segments are employed, to employ electrical connectors as cable terminal members, and to secure such connectors to cable ends in the field, and connectors of numerous types are available for this purpose.

Beause the conductor in the cable and the connector which must be of conductive material such as copper or brass, must be insulated to protect personnel from electric shock and the conductor and connector may both be adversely affected if exposed to corrosive influences in the atmosphere or which may be present due to an industrial environment, an insulating sleeve is customarily disposed over the connector, the portion of the electrical cable at which juncture with the connector occurs, and a portion of the cable insulation. In order to preserve the conductive surfaces from deleterious outside influences, it is, of course, desirable that the surfaces be kept within the insulating sleeve and covered by it. Unfortunately, in use cable insulation is frequently grasped by operators and there is a tendency for it to be pulled away from the connector. Not infrequently the cable insulation is pulled out of the insulating sleeve, exposing the bare metal strands within the electrical cable. This is, of course, an undesirable condition. The same undesirable condition can, of course, occur with cable terminal members other than connectors, such as, for example, welding electrode holders. The ensuing discussion, though referring specifically to connectors will be uderstood to embrace such other cable terminal members as well.

Accordingly, it is the primary object of this invention to prevent the pulling out of cable insulation from an insulating sleeve under conditions of use. Usually connection is made between cable and connector by stripping away a portion of the cable insulation at the end of the cable from the conductive-strand core, and then uniting the cable core with the connector, as, for example, by inserting the strands of the core into a tubular portion of the connector where they the retained by means of a set screw, or by making a crimp in the connector itself. The primary object herein is implemented by utilizing a filament, which may be tightly wrapped about the cable insulation to hold it in place. The filament is then united with the connector together with the bare strands of the cable. The filament may consist of a wire tightly wrapped around the cable insulation, with free ends extending therefrom. The union is effected by simultaneously introducing a stripped end of a cable into an internal recess in the connector together with the free ends of the filament or wire. Retaining means in the connector such as a set screw or a crimp may then be actuated. Thereupon not only is the electrical cable firmly held to the connector, but as well such expedient prevents movement of cable insulation on the internal conductors of the cable.

Another object herein is to maintain protective insulation of a cable terminal assembly by means which may be readily applied in the field by those who use connectors. Special tools are not necessary nor is any special skill required for this purpose.

How these and many other objects are to be implemented will become clear through a consideration of the accompanying drawings wherein:

FIG. 1 shows a side view of an electrical cable with retaining means thereon, and an electric connector prior to assembly;

FIG. 2 shows a side view of components of FIG. 1 following assembly;

FIG. 3 is a bottom view of the assembly shown in FIG. 2;

FIG. 4 is a section taken at 4—4 of FIG. 3; a protective insulating sleeve being shown about the components in broken lines;

FIG. 5 shows a side view of an assembly partially in section, of cable and electrical connector in an alternative form; and FIG. 6 is a bottom view of the assembly seen in FIG. 5, an insulating sleeve being shown in section about the components.

In FIGS. 1–4 are a series of views of components illustrating a first embodiment of the present invention. Components are shown disassembled in FIG. 1, while in the remaining drawings of the group the components are shown in assembled condition. In such drawings an electrical connector 10 is shown having a connector portion 11 and cable conductor engaging portion 12.

To those skilled in the art, connector portion 11 will be recognizable as the interengaging portion of a male connector intended to interengage with a female connector which is not shown in the drawings, and such skilled persons will be fully familiar with the nature of such female connector. The connector portion 11 of the electrical connector 10 plays no part in the present invention and for this reason, while the present invention may be applied to female connectors as well as male connectors, its application to female connectors is not illustrated. Additionally, it should be observed that while the particular connector 10 here illustrated has connector portion 11 of the type which locks upon rotation after interengagement with a mating connector, because the connector portions plays no part in the present invention, it will be apparent that the present invention is equally utilizable with connectors of different type.

Cable connector engaging portion 12 of connector 10 is tubular having a hollow interior recess 13. Set screw 14 is present in the wall of portion 12. Electric cable 18 has conductor means consisting of conductive metal strands 19. External insulation 20 of neoprene or like insulating material surrounds the conductive strands 19 in cable 18.

Prior to assembly to a connector 10, conductive metal strands 19 at the end of cable 18 are stripped by cutting external insulating means 20 at 21 to uncover stripped portion 22 of cable 18. In the normal jointure of connector and cable, stripped portion 22 would then be introduced into interior recess 13 in connector 10, and set screw 14 tightened down to retain connector 10 and cable 18 in assembly.

In practicing the present invention, the purpose of which is to prevent pulling away of external insulating means 20 from connector 10 following assembly of cable and connector, a filament or wire 25 is wrapped around external insulation 20 in cable 18 and tightened by twisting at 26. Following such twist, which may be made by means of a pliers, wire 25 will bite into external insulating means 20, and free ends 27 and 28 in the filament or wire will extend from the twist. Such free ends are bent over and in practicing the present invention are inserted together with stripped portion 22 of cable 18 into interior recess 13 in connector 10. Set screw 14 is then tightened down. Thereafter the stripped end 22 of cable 18 may not be withdrawn from connector 10, nor may free ends of wire 25, 27, and 28. Such wire 25 thus provides means for preventing slipping of external insulation 20 on cable 18.

It will be understood that in use a protective insulating sleeve 29 will overlay connector 10, the point of juncture between connector 10 and cable 18, and a portion of external insulation 20 in cable 18. It will thus be appreciated that I have provided means to prevent the pulling out of the external insulating means at 20 in cable 18 from within sleeve 29.

Employment of the present invention with a connector differing somewhat from that shown in FIGS. 1–4 is shown in FIGS. 5 and 6. There connector 33 has connector portion 34 and cable conductor engaging portion 35. Cable conductor engaging portion 35 is a hollow tube having internal recess 36, such tube preferably being of deformable metal such as soft copper. A filament or wire 39 is wrapped about external insulation 40 of cable 41. Such filament or wire 39 is twisted at 42 and free ends 43 and 44 thereof are introduced into recess 36 together with stripped end 45 of cable 41. A crimp indentation 46, the manner of making which is well known in the art, is then made and thereby stripped end 45 and free ends 43 and 44 of filament or wire 39 will be retained in assembly with connector 33. In this manner it will be understood that means have been provided to prevent the withdrawal of external insulation 40 from its normal position within sleeve 47 which envelopes connector 33 and overlays a portion of external insulation of 40 of cable 41.

While I have illustrated specific embodiments of my invention it is apparent that changes and modifications may be made in the specific structures illustrated. Though so modified or changed such structures can still fall within the ambit of my invention.

I claim:
1. A cable terminal assembly comprising
   an electrical cable having conductor means and external insulating means therefor,
   an electrical cable terminal member having an internal recess therein, and a wall external to said internal recess, a portion of said conductor means being within said internal recess,
   separate filament means grippingly wrapped about said cable, said filament means having a portion within said internal recess, and
   retaining means in said wall in contact with said portion of said conductor means for retaining said portion of said conductor means and said portion of said filament means within said internal recess.

2. A cable terminal assembly as claimed in claim 1 wherein said filament is a wire having a free end portion within said internal recess.

3. A cable terminal assembly as claimed in claim 1 wherein said retaining means comprises set screw means in said wall whereby upon tightening said set screw means said portion of said conductor means in said cable and said portion of said filament means within said internal recess, may be locked therein.

4. A cable terminal assembly as claimed in claim 1 wherein said electrical cable terminal member includes a portion made of deformable material within which said internal recess and said wall are located and said retaining means comprises a crimp formed in said wall.

References Cited

UNITED STATES PATENTS

| | | | |
|---|---|---|---|
| 2,346,327 | 4/1944 | Pfeiffer | 339—104 X |
| 2,911,616 | 11/1959 | Townsend | 339—223 |
| 2,968,691 | 1/1961 | Canfield | 174—75 |
| Re.25,506 | 12/1963 | Stevens | 339—60 X |

RICHARD E. MOORE, Primary Examiner

U.S. Cl. X.R.

339—59